(12) United States Patent
Keinath et al.

(10) Patent No.: US 7,182,165 B1
(45) Date of Patent: Feb. 27, 2007

(54) SNOW CYCLE

(76) Inventors: Mark B. Keinath, 595 N. Dehmel Rd., Saginaw, MI (US) 48601; John E. Keinath, 11120 Baker Rd., Frankenmuth, MI (US) 48734

( * ) Notice: Subject to any disclaimer, the term of this patent is extended or adjusted under 35 U.S.C. 154(b) by 0 days.

(21) Appl. No.: 10/341,673

(22) Filed: Jan. 14, 2003

Related U.S. Application Data

(60) Provisional application No. 60/349,007, filed on Jan. 14, 2002.

(51) Int. Cl.
    *B62M 27/02* (2006.01)
(52) U.S. Cl. ............ 180/185; 180/190; 280/22.1
(58) Field of Classification Search ........ 180/182–186, 180/190, 9.21, 9.23, 9.25, 9.26; 280/17, 280/22.1, 7.12, 7.1, 10, 11; 305/20
See application file for complete search history.

(56) References Cited

U.S. PATENT DOCUMENTS

| | | | | |
|---|---|---|---|---|
| 3,318,403 | A * | 5/1967 | Hansen | 180/185 |
| 3,336,994 | A * | 8/1967 | Pederson | 180/9.62 |
| 3,412,821 | A * | 11/1968 | Humphrey | 180/9.64 |
| 3,447,621 | A * | 6/1969 | Schoonover | 180/9.52 |
| 3,783,958 | A | 1/1974 | Canavan | |
| 3,783,959 | A * | 1/1974 | Krume | 180/183 |
| 3,822,755 | A * | 7/1974 | Hine | 180/185 |
| 3,860,080 | A * | 1/1975 | Firstenberg | 180/9.1 |
| 3,901,335 | A * | 8/1975 | Johnson | 180/190 |
| 3,913,693 | A * | 10/1975 | Hale et al. | 180/193 |
| 4,131,292 | A * | 12/1978 | Swech | 180/183 |
| 4,434,867 | A | 3/1984 | Grinde | |
| 4,437,534 | A | 3/1984 | Grinde | |
| 4,442,913 | A | 4/1984 | Grinde | |
| 4,502,560 | A | 3/1985 | Hisatomi | |
| 4,534,437 | A * | 8/1985 | Howerton et al. | 180/185 |
| 4,613,006 | A | 9/1986 | Moss et al. | |
| 4,699,229 | A * | 10/1987 | Hirose et al. | 180/9.21 |
| 4,719,983 | A | 1/1988 | Bruzzone | |
| 4,768,794 | A | 9/1988 | Bibollet | |
| 4,796,902 | A * | 1/1989 | Capra | 280/16 |
| 4,823,903 | A | 4/1989 | Bibollet et al. | |
| 4,848,503 | A * | 7/1989 | Yasui et al. | 180/190 |
| 4,917,207 | A * | 4/1990 | Yasui et al. | 180/193 |
| 5,064,208 | A | 11/1991 | Bibollet | |
| 5,203,424 | A | 4/1993 | Gogo et al. | |
| 5,474,146 | A * | 12/1995 | Yoshioka et al. | 180/184 |

(Continued)

FOREIGN PATENT DOCUMENTS

JP          6-179389        *    6/1994

*Primary Examiner*—Anne Marie Boehler
(74) *Attorney, Agent, or Firm*—Robert L. Stearns; Dickinson Wright PLLC

(57) ABSTRACT

A snow cycle includes a conventional motorcycle chassis having a set of steerable front forks and a rear swing arm, which normally mount front and rear wheels of the cycle, respectively. A snow track module is mounted to the rear swing arm and has an endless track driven by a cog connected to a drive sprocket of the engine by a single chain. At least one and preferably a pair of skis are mounted off the front forks and are pivotable fore and aft as well as tiltable to either side to maintain the ski flat to the ground when the vehicle is tilted to one side or the other when making an aggressive turn.

17 Claims, 10 Drawing Sheets

U.S. PATENT DOCUMENTS 5,518,080 A * 5/1996 Pertile .................... 180/190
6,095,275 A    8/2000 Shaw
6,112,840 A    9/2000 Forbes

* cited by examiner

SNOW CYCLE

The disclosure incorporates the snow cycle disclosed in provisional patent application 60/349,007, filed Jan. 14, 2002 whose priority is claimed for this application.

BACKGROUND OF THE INVENTION

1. Technical Field

This invention relates generally to motorcycles equipped with a rear track and front skis to enable the motorcycle to travel in snow, and to conversion kits for such motorcycles.

2. Related Art

Snow vehicles having substantially the same upper frame structure as that of a motorcycle are know to the art to be equipped with an endless track mounted at the rear of the vehicle in place of the rear drive wheel, and a steering ski mounted at the front portion in place of the front wheel. Such a vehicle is disclosed, for example, in U.S. Pat. No. 5,474,146. In this case, the swing arm of the motorcycle is removed and replaced with a modified swing arm mounting an intermediate set of transfer sprockets which connect the drive hub of the endless track to the drive sprocket of the engine through two linking chains. Such modification and requirement for replacement of the swing arm adds considerable cost and complexity to the manufacture and operation of such snow vehicles. Further, the front ski is pivotal in only the fore and aft direction, and thus the skis roll with the vehicle to the right or left when the vehicle is tilted to one side or the other, such as when making aggressive, sharp turns as one would normally do when operating a conventional motorcycle with front and rear wheels. Such tilting of the motorcycle has the effect of rolling the front ski toward one edge or the other, causing the ski to come out of full contact with the ground, thus losing traction and control of steering.

It is an object of the present invention to simplify the manufacture and construction of such snow cycles and to improve their steering and handling performance.

SUMMARY OF THE INVENTION AND ADVANTAGES

A snow cycle constructed according to the invention includes a motorcycle chassis having a frame, a pair of steerable front forks, a rear swing arm pivoted at a forward end to the frame, a seat for an operator, and an engine mounted on the frame and operative to drive a rotatable drive sprocket and associated drive chain. A snow track device is mounted on the rear swing arm and is coupled by the drive chain to the drive sprocket for driven rotation of an endless track of the snow track device. A ski assembly is mounted on the steerable front forks and is pivotal relative to the forks about two pivot axes disposed transverse to one another.

The invention also contemplates a snow conversion kit for a motorcycle which includes the snow track assembly and ski assembly above. The invention has the advantage of providing a snow cycle with a front ski assembly which is pivotable about two transverse axis, enabling the front ski assembly to pivot up and down in the usual manner, but also enable the front ski assembly to tilt from side to side relative to the forks, such that when the snow cycle is leaned to one side when making an aggressive turn, the ski assembly remains fully and flatly in contact with the snowy terrain.

According to a preferred embodiment, the front ski assembly includes two skis which are pivotable in the up and down direction independently of one another, yet tiltable from side to side relative to the forks together as a unit. Such a ski assembly provides enhanced steerability and performance to such snow cycles.

The invention has the further advantage of enabling the front ski assembly and rear snow track device to be mounted on an otherwise conventional motorcycle without substantial or any modification of the existing mounting points and structure associated with mounting the wheels of the motorcycle. As such, the owner of a motorcycle having a set of wheels along with the subject snow conversion kit can quickly change between the wheels and kit with little or no modification to the motorcycle swing arm and chain drive system or to the front forks.

THE DRAWINGS

These and other features and advantages of the present invention will become more readily appreciated when considered in connection with the following detailed description and appended drawings, wherein.

DETAILED DESCRIPTION OF THE PREFERRED EMBODIMENT

Figure 1:
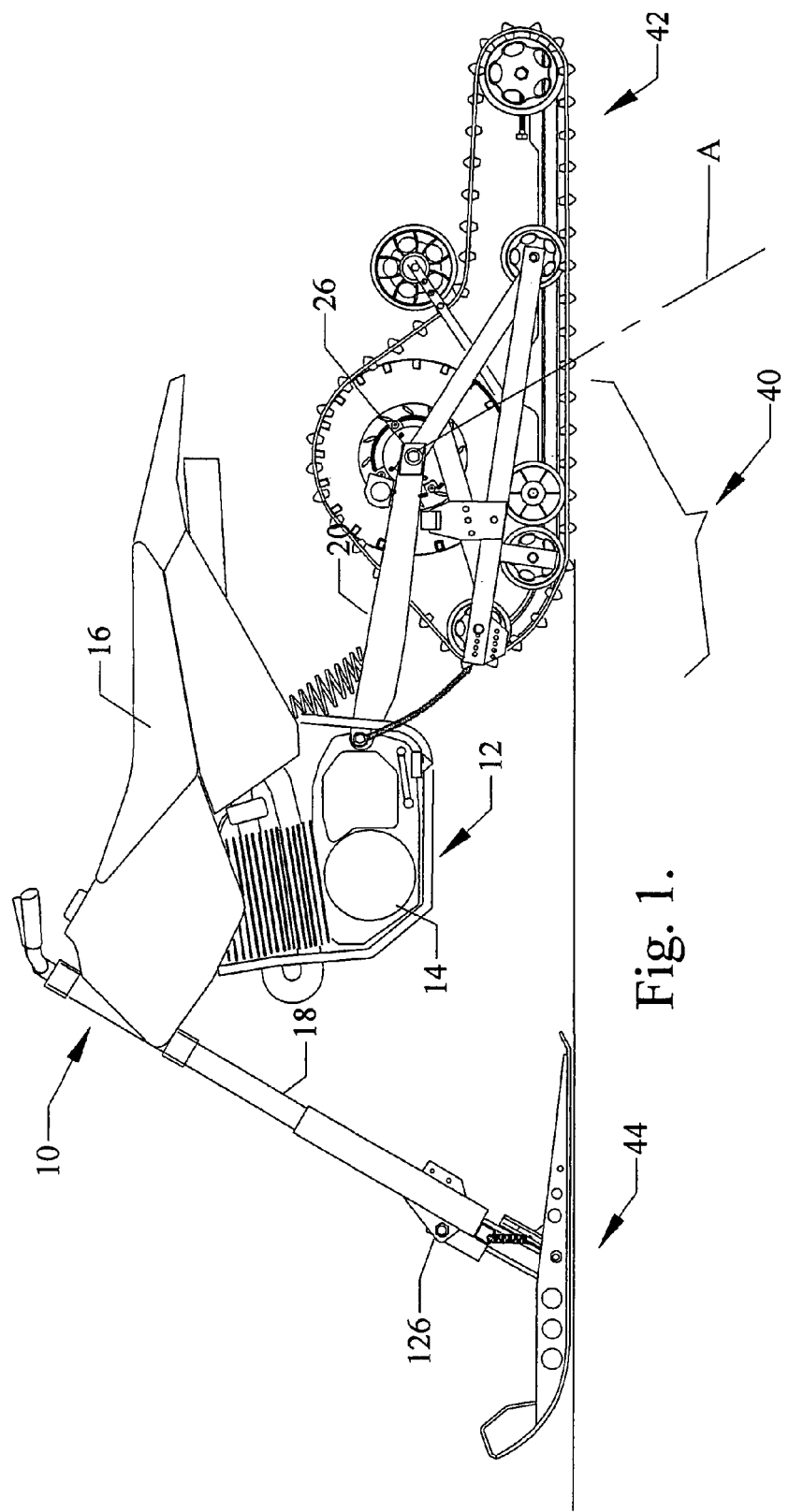
FIG. 1 is a side elevation view of a snow cycle constructed according to the present invention.
Figure 2:
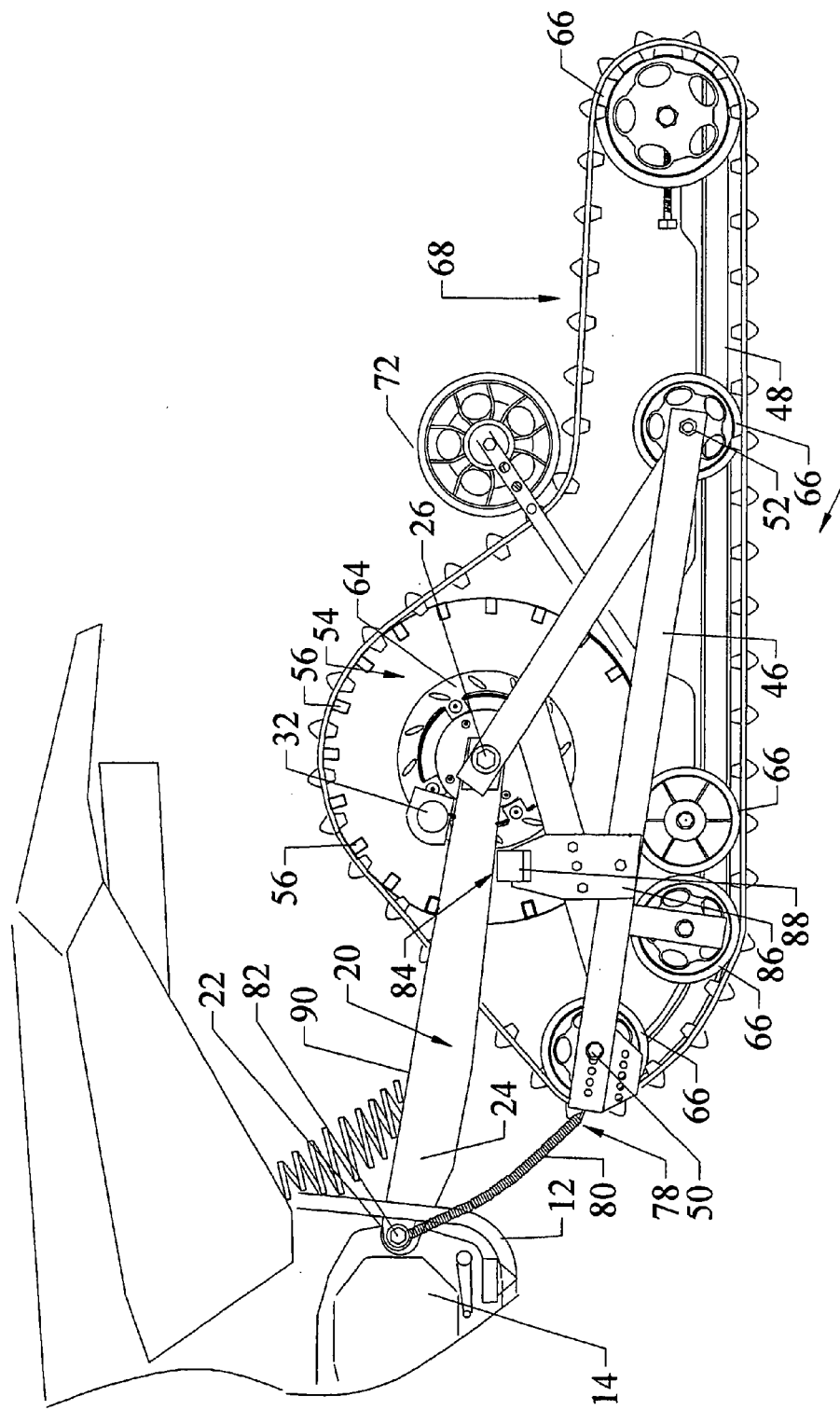
FIG. 2 is an enlarged fragmentary elevation view showing details of the snow track.

Referring to the enclosed drawings, a conventional off-road motorcycle vehicle 10 is shown having a frame 12 mounting an internal combustion engine 14, a seat 16 for an operator, and a set of steerable front forks 18. A rear swing arm 20 is pivoted at its forward end to the frame 12 by pivot connection 22 and includes a pair of laterally spaced arm portions 24 which extend rearwardly to free ends and support a transverse rear axle bolt 26 that is parallel to, but spaced from, the pivot connection 22 and is swingable with the swing arm 20 with up and down movement about an arc centered about an axis A of the pivot connection 22.

The engine 14 has an output shaft (not shown) on which a drive sprocket 28 is mounted. An endless, flexible drive chain 30 is entrained about and driven by the drive sprocket 28 for transmitting rotation of the sprocket 28 into driven rotation of the chain 30.

Normally, such motorcycle vehicles 10 are equipped with a rear wheel assembly (not shown) which fits between the arm portions 24 of the swing arm 20 and is supported for rotation on the axle bolt 26. The wheel (not shown) normally mounts a driven sprocket on one side which is coupled by the drive chain 30 to the drive sprocket 28 of the engine 14 to transmit the power of the engine 14 to the rear wheel (not shown). The opposite side of the wheel (not shown) mounts a brake disc (not shown) that rotates with the wheel and passes through a brake caliper 32 mounted on the swing arm 20. The brake caliper 32 is operative when actuated, to frictionally engage and break the rotation of the disc, and thus the wheel. Both the sprocket and brake disc are removably mounted on the hub of the wheel by means of fasteners or the like.

According to the present invention, the standard rear wheel assembly, including the sprocket and brake disc, are dismounted from the swing arm 20 by removal of the axle bolt 26 and removal of the chain 30 from the rear drive sprocket of the wheel hub. The front wheel (not shown) is also dismounted from the front forks 18 by removal of an associated front axle bolt 34. The front braking components, including calipers and control cable (both not shown) may also be removed. The front and rear wheels are replaced with a snow kit 40 that includes a drivable rear snow track assembly 42 mountable on the rear swing arm 20 and a front ski assembly 44 mountable on the front forks 18 in place of the conventional wheels.

One feature of the presently preferred embodiment of the invention is that the snow track 42 and ski assembly 44 are mountable on the motorcycle frame 12 using the same mounting locations and mounts as those used to mount the wheels, thus requiring no or minimal modification of the motorcycle when switching between the wheels and snow kit 40.

The snow track assembly 42 includes a rigid frame structure 46 mounting a set of rigid, elongate guide rails 48 by cross bolts 50, 52, respectively. The frame 46 is connected at its peak to the swing arm 20 by rear axle bolt 26, thus using the same mounting location to mount the snow track 42 as that used to normally mount the rear wheel (not shown). The axle bolt 26 for the snow track 42 may be slightly longer than that used for the rear wheel in order to accommodate the wider frame 46, which is mounted to the outside of the arm portions 24 of the swing arm 20.

The snow track assembly includes a toothed drive cog 54 disposed between opposite sides of the frame 46 and supported for driven rotation about the rear axle bolt 26. The drive cog 54 has a drum-like body 55 preferably fabricated of a strong, but lightweight material and carries a plurality of evenly spaced, circumferentially arranged drive teeth 56 which project laterally outwardly from laterally opposite sides 58, 60 of the body of the drive cog 54. The body 55 of the drive cog may be fabricated of a reinforced resin composite, plastics, or other lightweight material such as a casting of aluminum or magnesium, for example. The teeth 56 may be permanently or replaceably fixed on the body 55 and may be made of the same or different material. For example, the teeth 56 may comprise a plurality of aluminum bars embedded in a composite body 55, or may be cast of aluminum, magnesium or other strong, lightweight metal as one piece with the body 55 of the same material. The drive cog 54 is equipped with suitable wheel bearings (not shown) for journaling the drive cog 54 on the axle bolt 26.

A driven sprocket 62 is fixed to one side 58 of the drive cog 54 by suitable fasteners and is rotatable with the cog 54 about the axis of the axle bolt 26. The sprocket 62 is directly driven by the drive sprocket 28 of the engine 14 by connection of the single drive chain 30, such that the cog 54 is driven in the same manner as that of the rear wheel. According to a preferred but optional feature of the invention, the sprocket 62 mounted on the drive cog 54 preferably has the same bolt pattern as the sprocket mountable on the rear wheel (not shown) of the motorcycle 10. In fact, the user of the snow kit 40 may, if desired, dismount the sprocket from the rear wheel and mount it to the drive cog 54 by suitable fasteners. In this way, the drive of the rear wheel and that of the cog 54 are identical. Of course, the user of the snow kit 40 may wish to select a larger or smaller size sprocket 62 than that which may be used on the rear wheel to achieve the desired power/speed performance from the snow kit 40.

A brake disc 64 is bolted on the opposite side 60 of the cog 54 and communicates with the brake caliper 32 mounted on the swing arm 20. When actuated, the caliper 32 applies a braking action to the brake disc 64 to slow the rotation of the drive cog 54 in the same manner as a conventional rear wheel. As with the sprocket 62, the brake disc 64 may be the same or equivalent to that used on the rear wheel (not shown).

The guide rails 48 of the frame 46 mount a plurality of sets of track wheels or rollers 66. An endless, reinforced rubber drive track 68 is entrained about the drive cog 54 and track wheels 66 of the guide rails 48. The track 68 is formed on its outer running surface 69 with a plurality of circumferentially spaced traction cleats 70, and is formed on its inner surface with a plurality of circumferentially spaced lugs or knobs 71 which are engaged by the teeth 56 of the drive cog 54 to drive the track 70 in response to driven rotation of the drive cog 54. The track 68 has a fixed, uniform width which is sized to enable the track 68 to run between the spaced arm portions 24 of the swing arm 20. Depending, of course, on the particular brand and model of the motorcycle to be modified with the installation of the rear snow track assembly 42, the spacing of the arm portions 24 of the swing arm 20, and thus the width of the track 68, may vary. It is contemplated that the width of the track will fall in the range of between 4 to 10 inches, more preferably in the range of 6 to 8 inches, and still more preferably be about 6 inches in width. The track 68 may be of the same type used on snowmobiles, but cut to the narrower width to fit between the arm portions 24 of the swing arm 20. The drive cog 54 likewise has a width that does not exceed the spacing between the arm portions 24, and preferably extends no further than the edges of the track 68. The frames 46, however, are spaced further apart than the spacing between the arm portions 24, and in fact are mounted to the outside of the arm portions 24.

A tension wheel 72 is mounted on a set of rigid tension arms 74 of the frame 46 rearwardly of the drive cog 54. A cross pin 76 extends between the tension arms 74 and journals the tension wheel 72 in position to ride along the outer running surface 69 of the track 68 at a location behind the drive cog 54. The tension wheel 72 is offset in relation to the drive cog 54 and rearward-most set of track wheels 66. By routing the flexible track 68 over the drive cog 54 and rear track wheels 66, but under the tension wheel 72, a serpentine (i.e., non-linear) path of the track section is defined running between the drive cog 54 and rear track wheels 66. With the track 68 tightened, the tension wheel 72 exerts a constant inward tension on the track 68 and also causing more of the track 68 to wrap further around and be engaged by more surface of the drive cog 54 than if the tension wheel 72 were not present. The tension wheel 72 maintains downward pressure on the track section 68 and keeps it from jumping or flapping during use, in order to make certain that the track 68 maintains engagement with the drive cog 54 and does not slip off its guides.

It will be appreciated from the drawings that the rear snow track assembly 42 is mounted on the swing arm 20 at a single mounting point via the axle bolt 26, such that the snow track assembly 42 is able to pivot fore and aft about an axis A of the axle bolt 26. The forward-most ends of the rails 48 are curved upwardly and thus support the forward-most set of track wheels 66 above ground level, effectively elevating the lead portion of the track 68, enabling the track 68 to climb up and over approaching terrain. The remaining length of the rails 48 present a relatively, long flat run section of the track 68 to provide a fairly long, wide footprint for engaging the snow or other terrain. The ground-engaging flat run section of the track 68 preferably has a length of about 4 to 5 feet and extends rearwardly of the drive cog 54, such that the distance from the rear axle bolt 26 to the rearward-most set of track wheels 66 is about twice as great as the distance from the rear axle bolt 26 to the forward-most set of track wheels 66. This has the effect of offsetting the weight balance of the snow track 42, such that the rear end is biased under its own weight to pivot downwardly toward engagement with the terrain.

According to a further preferred aspect of the invention, a spring bias system 78 is provided for urging the front end of the snow track assembly 42 upwardly toward the frame 12 of the vehicle. When the snow track assembly 42 loses contact with the ground, such as during a jump, the spring bias system 78 supports the front of the snow track 42 against tipping downwardly, such that the track 68 is properly positioned when the track 68 returns to engagement with the terrain. The spring bias system 78 includes at least one and preferably a pair of tension springs 80 which are coupled at their lower ends to the forward end of the track frame 46 on opposite sides of the track 68, and at their upper ends to the frame 12 of the motorcycle vehicle 10. During normal use when the track 68 is in full contact running engagement with the terrain, the springs 80 are preferably slightly tensioned and thus are applying a constant upward load on the forward end of the track 42. According to a further preferred feature, the upper ends of the tension springs 80 are connected by a cross bar 82, which may extend through a tubular opening in the frame 12, preferably where the swing arm 20 is mounted pivotally to the frame 12. In this way, the tension springs 80 and cross bar 82 are readily connectable and detachable from the frame 12 for easy installation and removal.

The track frame 46 is preferably fitted with at least one and preferably a pair of travel limiting stops 84 disposed forward of the rear axle bolt 26 in position to confront the swing arm 20 in response to rotating the forward end of the snow track assembly 42 upwardly to a predetermined limit position. The travel limiting stops 84 are preferably in the form of a rigid brackets bolted or otherwise fixed to the track frame 46 and projecting upwardly toward the underside of the swing arm 20. The brackets 86 carry elastic bumpers or cushions 88 at their free ends. The bumpers 88 are preferably spaced slightly out of contact with the underside of the swing arm 20 during normal operation of the motorcycle vehicle 10, such that as the track 68 is traveling across flat terrain, the bumpers 88 are held slightly out of contact with the swing arm 20. When the vehicle 10 encounters a condition which causes the front of the snow track 42 to swing upwardly, such as when the vehicle travels over rough terrain or leaves the ground when traveling over a jump, the stops 84 limit such upward pivoting of the forward end by confronting the swing arm 20. The stops 84 prevent the upper track section 68 forward of the drive cog 54 from contacting the cross yoke 90 of the swing arm 20 that connects its arm portions 24.

Figure 3:
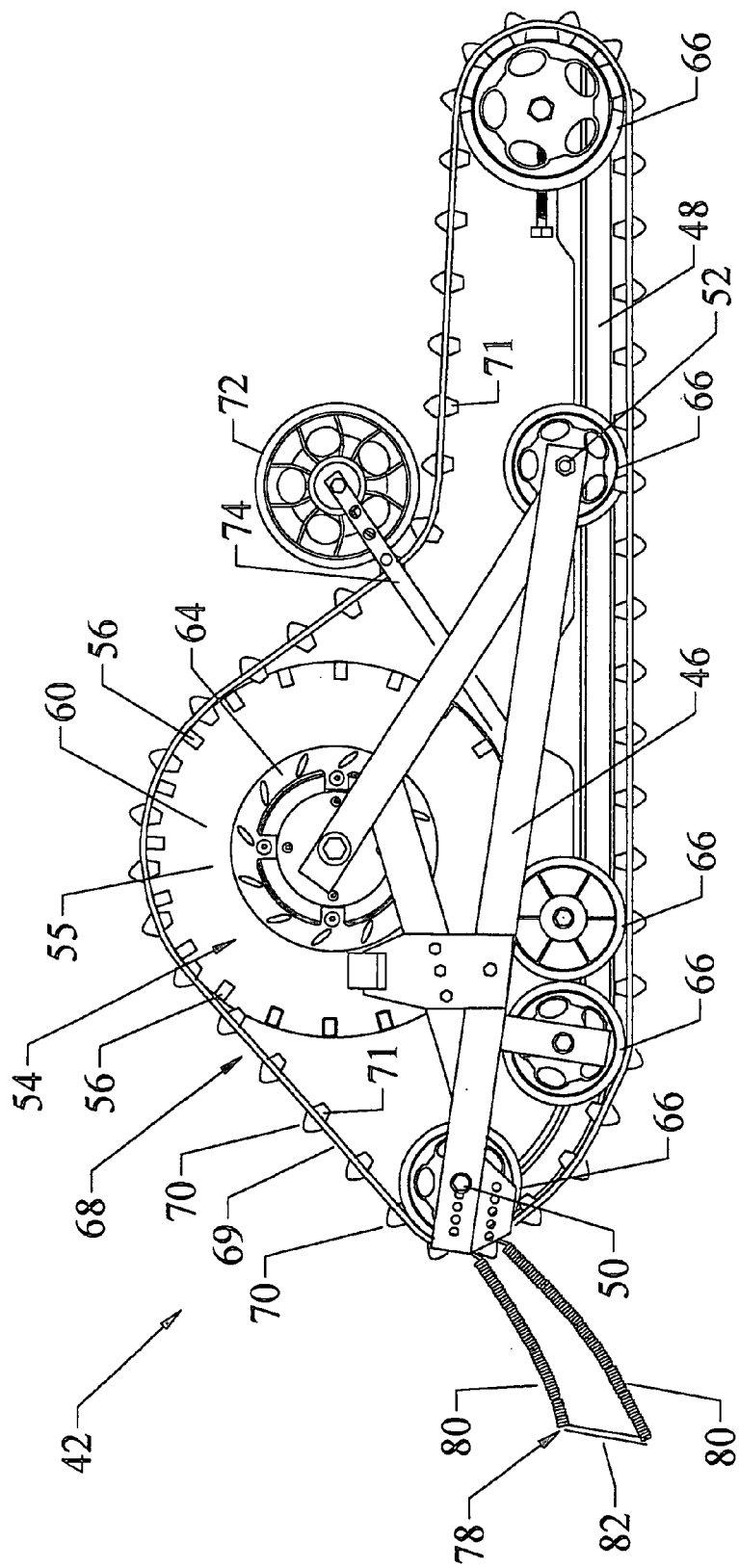
FIG. 3 is an elevation view of the snow track dismounted from the motorcycle.
Figure 4:
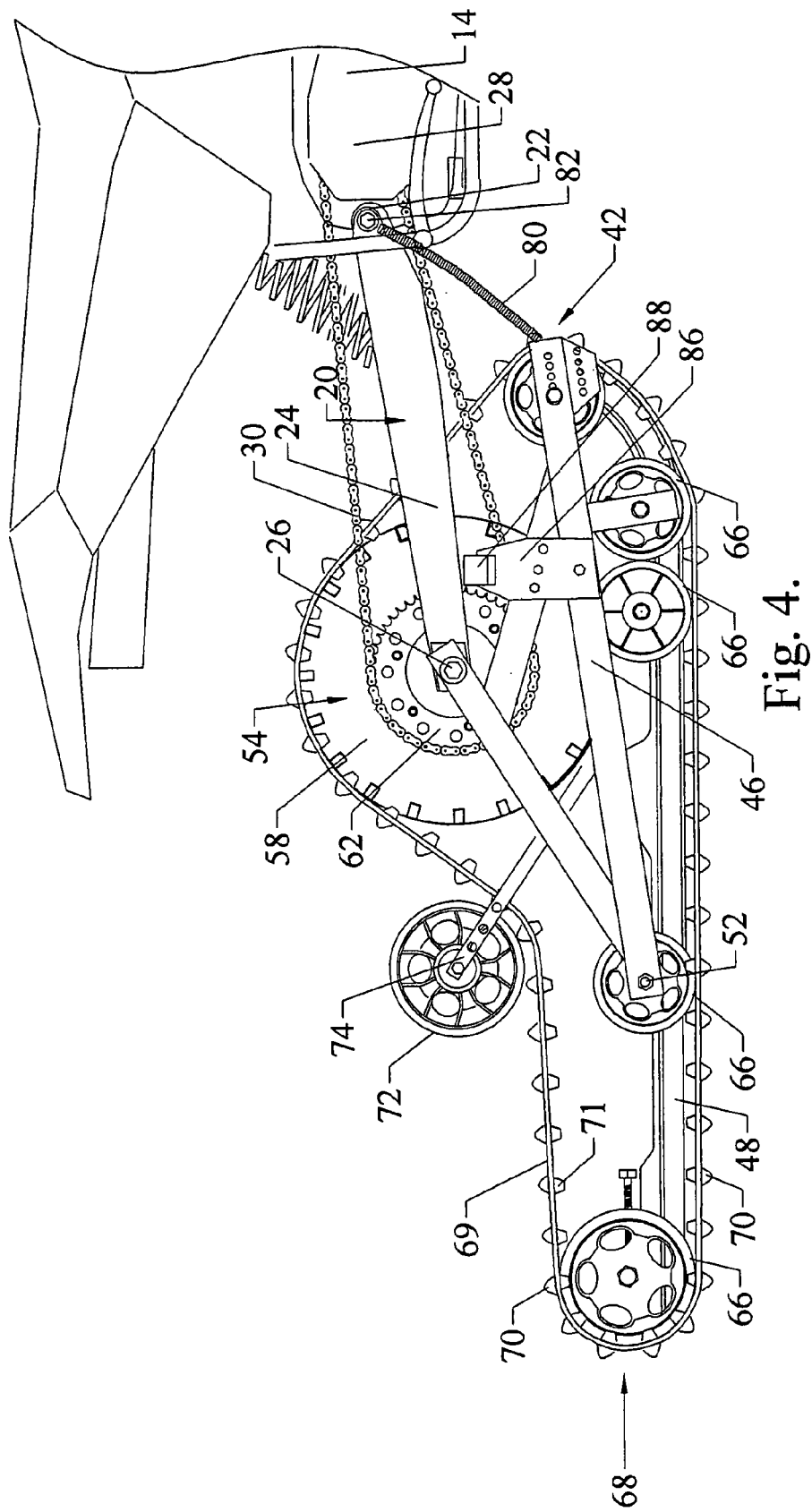
FIG. 4 is a view like FIG. 2 but of the opposite side.
Figure 5:
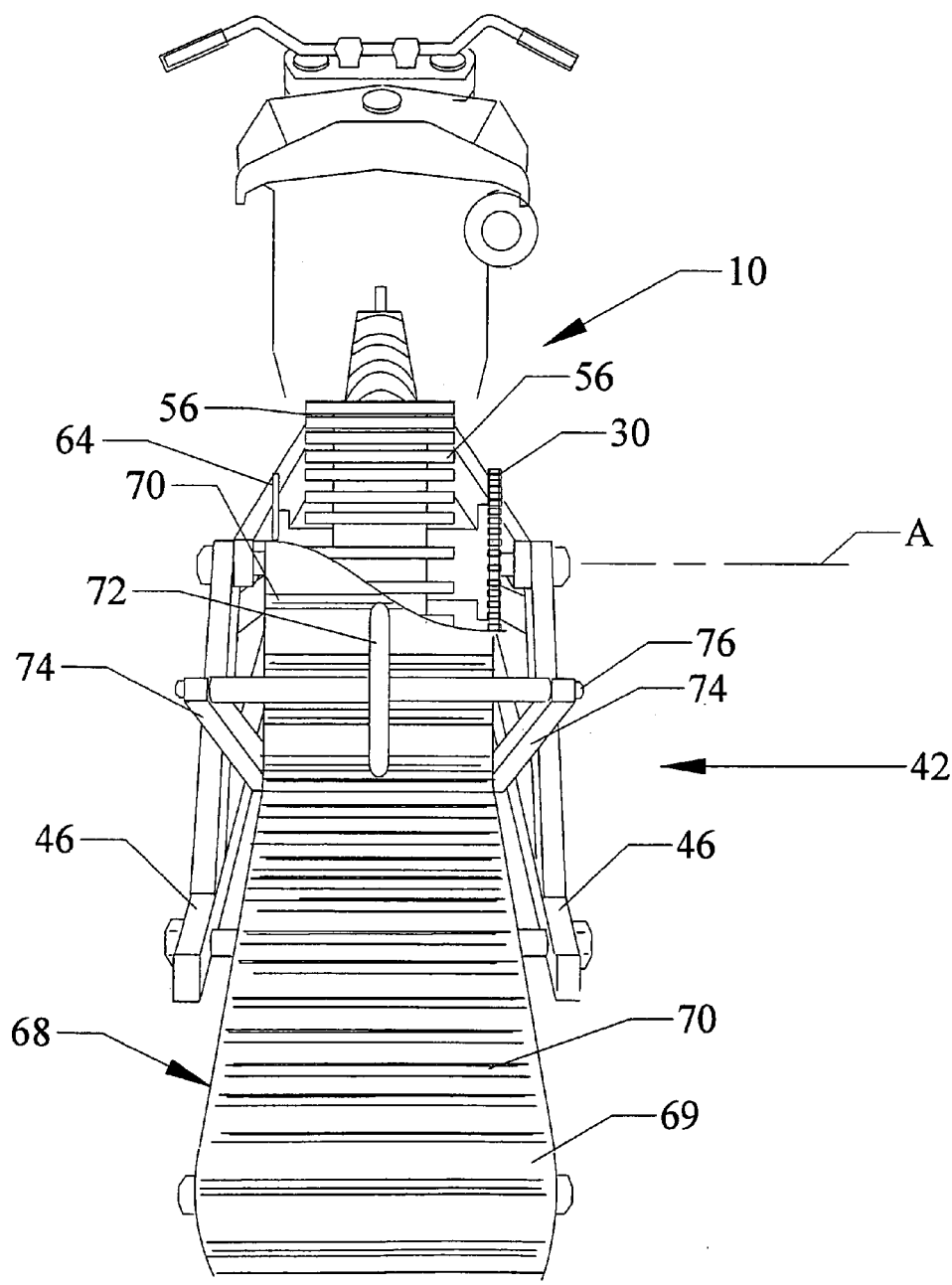
FIG. 5 is an elevational rear view of the snow track, with portions of the belt broken away.

As is apparent from FIG. 3, the snow track assembly 42 is provided as a self-contained, ready-to-mount unit which easily mounts to the motorcycle vehicle 10 by connection with the rear axle bolt 26 and drive chain 30, along with the cross 82 and tensions springs 80, without requiring any modification to the frame 12 or swing arm 20 of the vehicle 10.

Turning now to the front of the vehicle 10, the front wheel (not shown) is replaced by the ski assembly 44. The ski assembly 44 mounts to the front forks 18 at established mounting and bolt locations normally associated with the mounting of the front wheel (not shown) and front brake calipers (not shown) which have been removed, such that the ski assembly 44 secures to the front forks 18 without permanent modification of the forks 18. The ski assembly is steerable with the forks 18.

Figure 6:
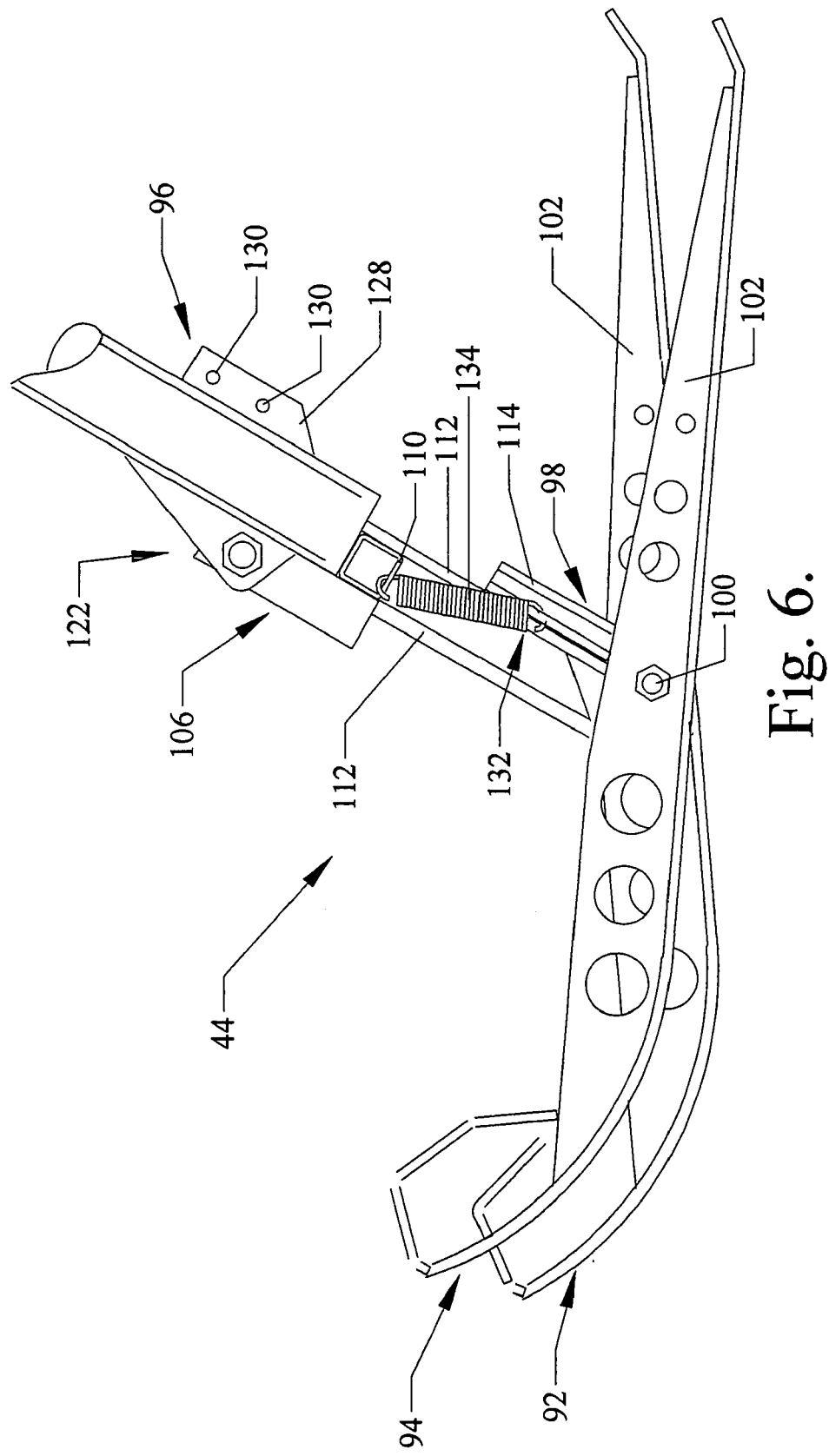
FIG. 6 is a side elevation view showing details of the front ski assembly.

The ski assembly 44 includes at least one and preferably a pair of elongate skis 92, 94 which are preferably attached to the forks by a multi-axial pivot mount system 96. The mount system 96 includes a cross frame 98 coupled to the at least one and preferably pair of skis 92, 94 about a transverse pivot axis B by means of a cross pin 100 extending through aligned holes formed in upstanding ribs 102 of the skis 92, 94 and through associated pivot hubs or eyes 104$a$, 104$b$, 104$c$ of the cross frame 98, such that the skis 92 are able to pivot relative to the cross frame 98 fore and aft about the axis B independently of one another, as illustrated best in FIG. 6. The axis B extends crosswise to the length of the forks 18 and lies in a plane parallel to a plane containing both forks.

Figure 9:
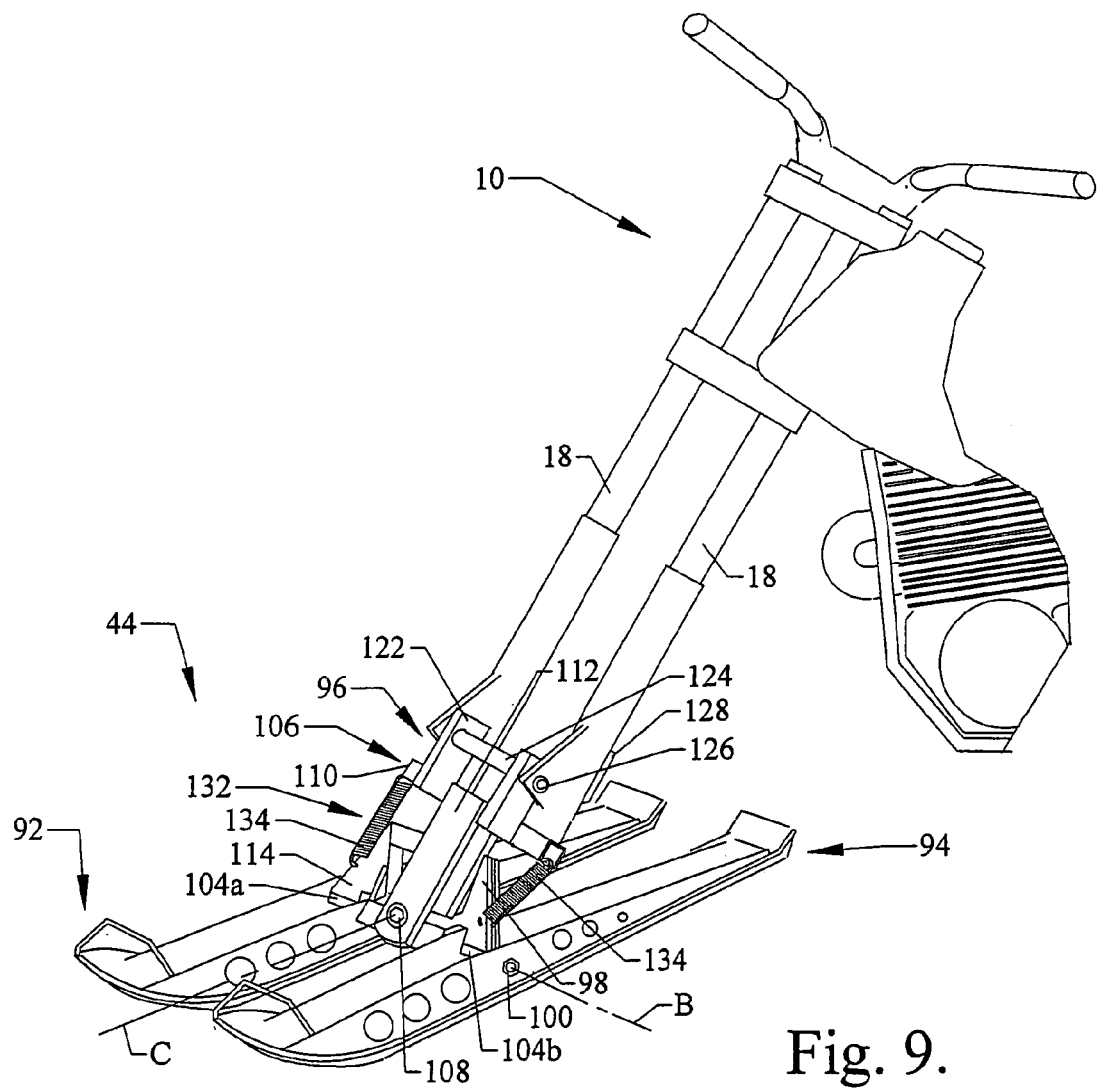
FIG. 9 is a front elevation view of the snow cycle tilted to one side.
Figure 10:
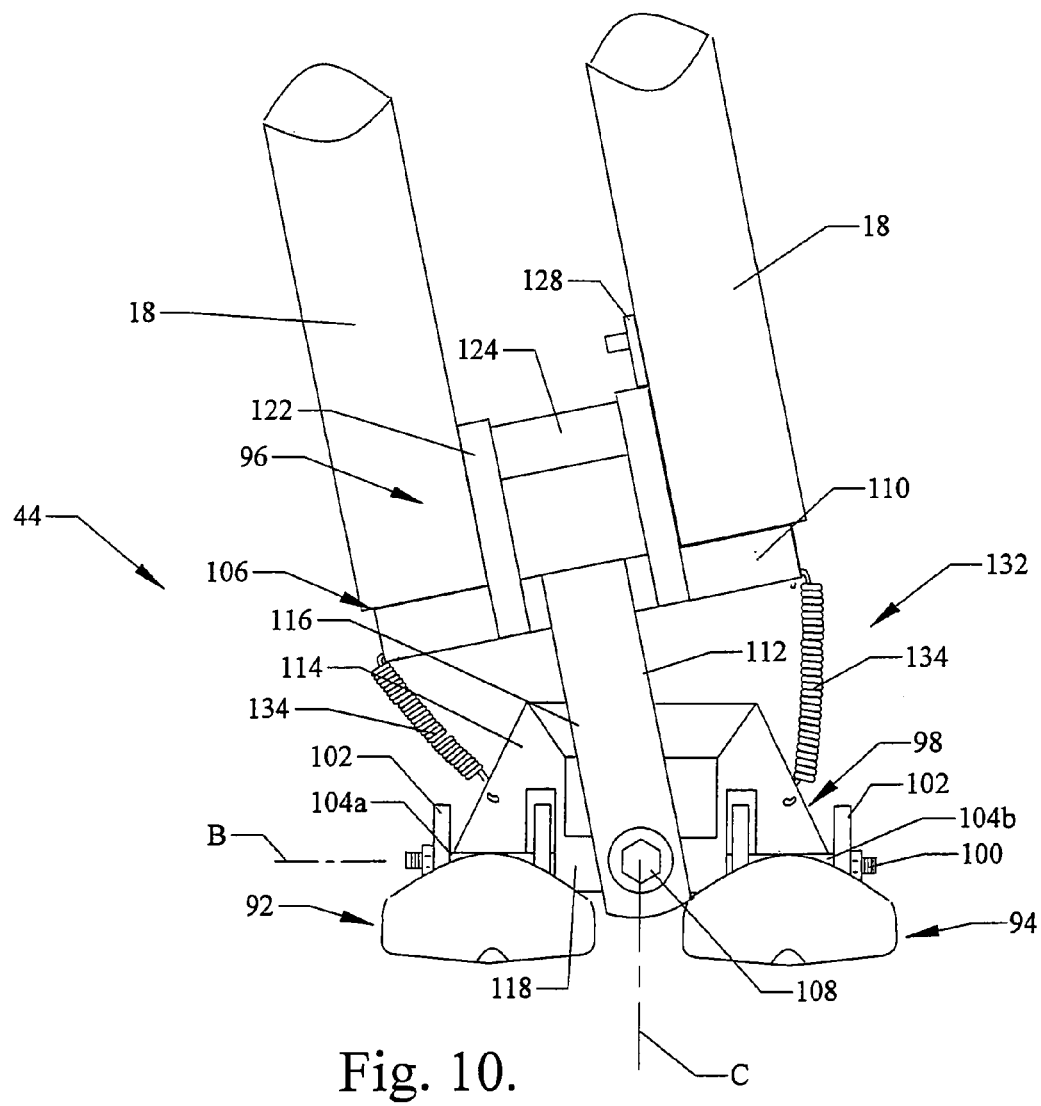
FIG. 10 is an enlarged fragmentary front elevation view showing details of the skis.

The pivot mount system 96 further includes an upper tilt bracket 106 which extends between and is rigidly connected at its upper end to the front forks 18, and is coupled at its lower end to the cross frame 98 by a tilt pin 108. The tilt pin 108 defines a tilt axis C which is perpendicular to the fore/aft pivot axis B of the cross pin 100. The tilt axis C lies in a plane perpendicular to the plane containing the forks 18, and enables the tilt bracket 106, and thus the frame 12 of the motorcycle vehicle 10 to tilt to one side or the other relative to the lower cross frame 98, and thus the skis 92, 94, as illustrated in FIGS. 9 and 10. In this way, both skis 92, 94 remain in contact with the ground during tilting of the skis 92, 94 about the tilt axis C, allowing optimum control over the steering of the vehicle 10 when the vehicle 10 is tilted during a sharp turn.

The upper end of the tilt bracket 106 has a generally T-shaped body, with a cross piece 110 extending between and engaging the lower ends of the forks 18, and a rigid link (preferably a pair of such links) 112 extending downwardly from the cross piece 110 and coupled by the tilt pin 108 adjacent its lower end to the cross frame 98 at a location between the skis 92, 94, such that the skis 92, 94 are disposed on laterally opposite sides of the tilt pin 108. The lower cross frame 98 includes an upstanding stop brace 114 which extends crosswise to the skis 92, 94 and is fixed to the center hub 104$c$ extending between the skis 92, 94 and to the two outer hubs 104$a$, 104$b$. The lower ends of the links 112 are coupled to a forwardly extending mounting bracket 118 of the center hub 104$c$, which has the effect of imparting a constant forward rotational moment to the center hub 104$c$, and thus the stop brace 114, when downward weight is applied to the tilt bracket 106 through its connection with the forks 18 and tilt pin 108. The stop brace 114 extends behind the links 112 and presents a stop surface 116 which confronts a corresponding stop surface 120 on the back side of the links 112. Such enables the tilt bracket 106 to tilt about the axis C of the tilt pin 108, while supporting the cross frame 98 against forward tipping beyond the links 112.

As best shown in FIGS. 9 and 10, the upper end of the tilt bracket 106 is preferably fixed to the forks 18 at available mounting locations on the forks 18 normally associated with the mounting of the front wheel and front brake components.

Preferably, the tilt bracket 106 includes an upstanding central mounting bracket 122 extending into the space between the forks 18 and having a transverse tubular hub 124 adjacent its upper end aligned with pre-established wheel mounting openings in the front forks 18 normally used to mount the front wheel. A mounting pin 126 is disposed in the openings and through the hub 124 to secure the tilt bracket 106 on the forks 18. An additional bracket 128 extends from the hub 124 and is secured by fasteners 130 to pre-established mounting locations on the front forks 18 normally associated with the mounting of the front brake caliper. Depending upon the particular mounting arrangement on the forks of a motorcycle to be outfitted with the front ski assembly 44, it may be desirable to rotate the lower cylinders of the front forks 1800 to dispose the mounting holes for the front brake caliper (not shown) inwardly for attachment to the bracket 128 as illustrated. Of course, the invention contemplates and incorporates herein by reference the tilt bracket 106 having whatever mounting arrangement is required based on the available mounting sites on a given motorcycle in order to fix the bracket to the lower ends of the forks, without requiring a permanent modification to the forks that would preclude the later removal and mounting of a normal front wheel on the motorcycle. The upper end mounting arrangement shown in the various drawings is that which is suited for the particular motor cycle used, and thus it is only one exemplary embodiment thereof for purposes of illustration.

Figure 7:
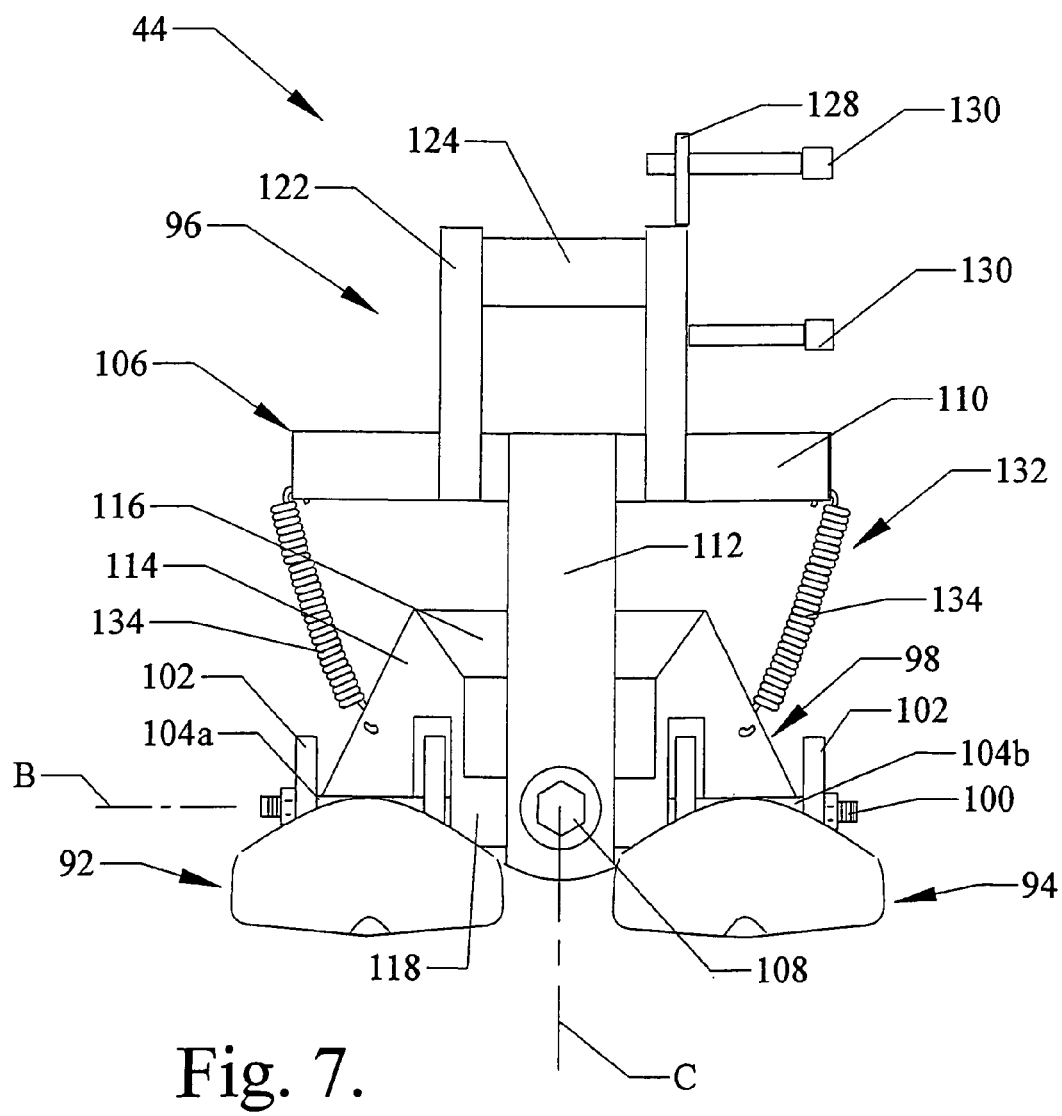
FIG. 7 is a front elevation view of the ski assembly.
Figure 8:
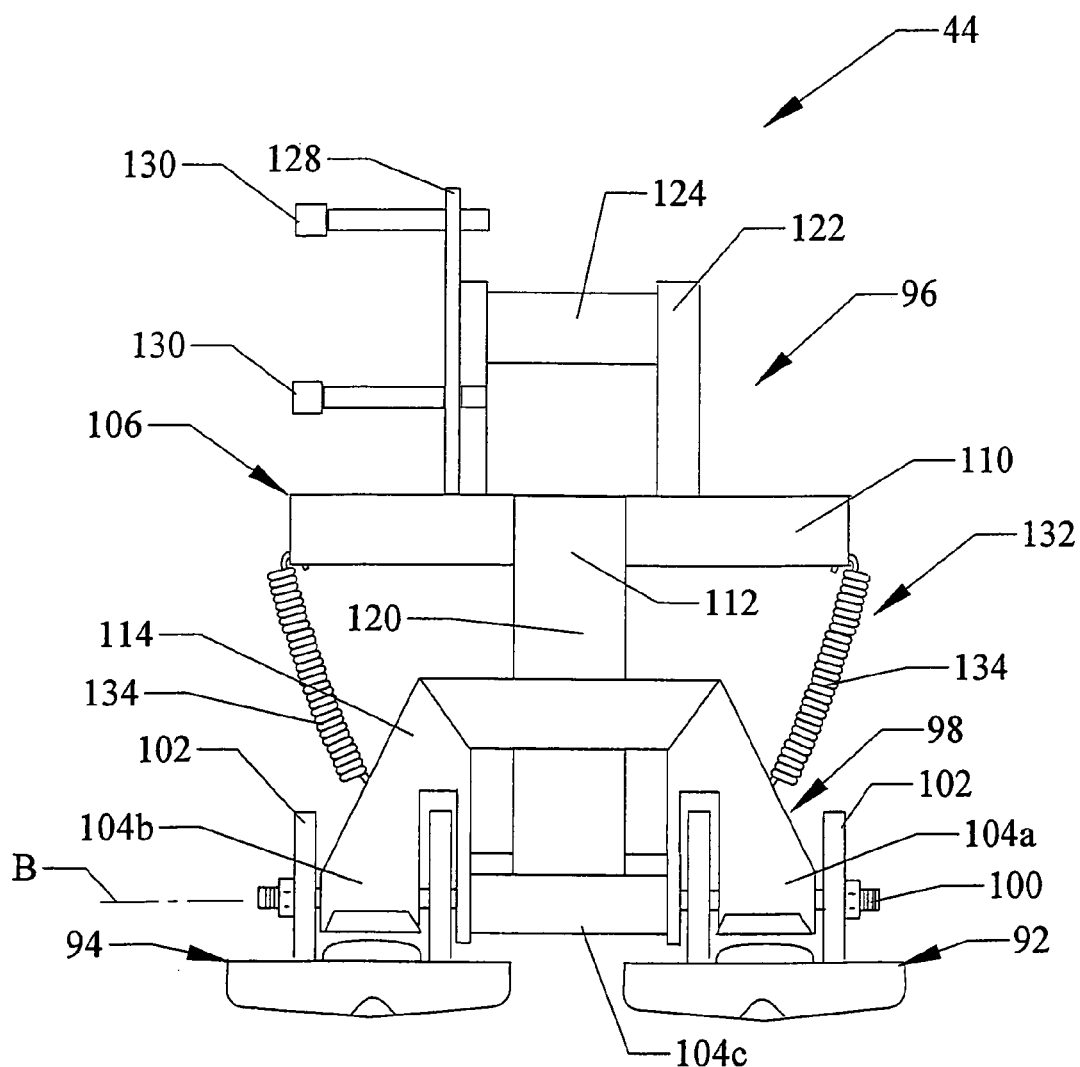
FIG. 8 is a rear elevation view of the ski assembly.

As shown best in FIGS. 7, 9 and 10, the upper tilt bracket 106 and the lower cross frame 98 are further connected by a resilient bias device 132 which operates to permit the tilt bracket 106, and thus the frame 12 of the vehicle 10, to tilt to one side or the other about the tilt axis C of the tilt pin 108, while exerting a constant bias force that resists such tilting and acts to return the cross frame 98 and thus the skis 92, 94 to a neutral centered position in which the longitudinal axis of the forks 18 are disposed generally perpendicular to the pivot axis B of the skis 92, 94. In other words, the resilient bias device 132 acts to constantly return the skis 92, 94 to a non-tilted relationship relative to the forks 18. Thus, when the front end of the vehicle 10 leaves the ground such as when traveling over rough terrain or over a jump at which point there is no weight applied to the skis 92, 94 from the vehicle 10, the resilient bias device 132 exerts a return balancing force to the skis, orienting them in a non-tilted position relative to the forks 18.

As illustrated in the various drawings, one embodiment of the resilient bias device 132 is in the form of a pair of tension springs 134 arranged on opposite sides of the tilt pin 108 and coupled at their lower ends to the cross frame 98, and preferably the stop brace 114, and coupled at their upper ends to the tilt bracket 106, and preferably the crosspiece 110 acting, when the tilt bracket 106 is tilted in one direction or the other, to apply a return bias force which, when the springs 134 are balanced, orient the skis 92, 94 in a non-tilted orientation relative to the front forks 18.

It will thus be appreciated from the foregoing description that a conventional motorcycle normally equipped with front and rear wheels can be readily converted to a snow vehicle by removing the wheels and mounting the snow kit assembly 40 with little or no modification of the motorcycle frame 12 that would inhibit the later removal and remounting of the wheels. Both the snow track assembly 42 and front ski assembly 44 are self-contained units which attach to existing mounting locations on the frame 12 for quick change between the snow kit 40 and the wheels (not shown). Although not preferred, it is contemplated that the snow track assembly 42 could be mounted to the back in combination with the normal front wheel on the forks 18, or the front ski assembly 44 used in combination with a conventional rear wheel.

Obviously, many modifications and variations of the present invention are possible in light of the above teachings. It is, therefore, to be understood that within the scope of the appended claims, the invention may be practiced otherwise than as specifically described. The invention is defined by the claims.

What is claimed is:

1. A snow cycle, comprising:
a motorcycle chassis having a frame, a pair of steerable front forks, a rear swing arm pivoted at a forward end thereof to said frame, a seat for an operator, and an engine mounted on the frame and operative to drive a rotatable drive sprocket and associated drive chain;
a snow track device mounted on said rear swing arm and coupled by said drive chain to said drive sprocket for driven rotation of an endless track of said snow track device; and
a ski assembly mounted on said steerable front forks and pivotable relative to said forks about two pivot axes disposed transverse to one another and substantially intersecting one another.

2. The snow cycle of claim 1 wherein said ski assembly includes a pair of skis.

3. The snow cycle of claim 2 wherein said skis are pivotal about a first of said pivot axes independently of one another.

4. The snow cycle of claim 3 wherein said skis are pivotal about a second of said pivot axes together as one unit.

5. The snow cycle of claim 4 wherein said ski assembly includes a multi-axial pivot mount system connecting said skis to said forks.

6. The snow cycle of claim 5 wherein said multi-axial pivot mount system includes a cross frame mounting said skis for said pivotal movement about said first pivot axis, and a till bracket coupling said cross frame to said forks and supporting said cross frame and said skis for pivotal movement about said second axis.

7. The snow cycle of claim 6 including a spring return device acting between said cross frame and said tilt bracket and constantly biasing said cross frame to a neutral centered position.

8. The snow cycle of claim 1 wherein said snow track device includes a drive cog mounting a driven sprocket coupled directly to said drive sprocket by a single said drive chain.

9. The snow cycle of claim 8 wherein said cog includes teeth engaging corresponding lugs of said track.

10. The snow cycle of claim 9 wherein said track device includes a pair of rails extending rearwardly of said drive cog and mounting a plurality of idler wheels about which track is entrained.

11. The snow cycle of claim 10 including a tensioner wheel riding against an outer surface of said track.

12. The snow cycle of claim 10 including a support frame mounting said rails for pivotal movement about an axle.

13. The snow cycle of claim 12 including a spring acting between said support frame and said swing arm to bias a forward end of said snow tack device pivotally upwardly about said axle.

14. The snow cycle of claim 8 including a brake disc mounted on and rotatable with said cog.

15. The snow cycle of claim 1 wherein said snow track device and said ski assembly are interchangeable with wheels.

16. The ski assembly of claim 1 wherein said at least one ski comprises a pair of skis mounted for independent fore and aft pivotal movement and for conjoint side to side pivotal movement.

17. A snow conversion kit for a motorcycle comprising:
a snow track assembly mountable on a rear swing arm of a motorcycle in place of a rear wheel, said snow track assembly having a rotatable drive cog and a sprocket fixed to said drive cog for connection by a chain to a drive sprocket of a motorcycle engine to rotate said cog; said snow track assembly including a frame, a pair of rails supported by said frame and mounting, a plurality of idler wheels, and an endless track entrained about said cog and said idler wheels; and
a ski assembly mountable on the steerable front forks of the motorcycle in place of a front wheel and having at least one ski that is pivotal about two transverse pivot axes substantially intersecting one another.

* * * * *